Nov. 12, 1968  J. SELBY  3,410,158
DIAL MECHANISMS
Filed April 21, 1967
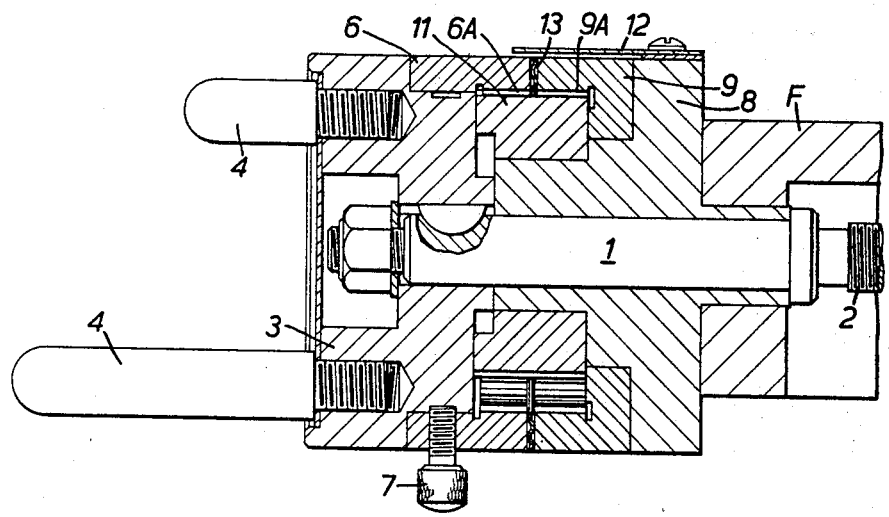
James Selby
INVENTOR
BY
Lawrence E. Laubscher
ATTORNEY

United States Patent Office 3,410,158
Patented Nov. 12, 1968

3,410,158
DIAL MECHANISMS
James Selby, Hatch End, England, assignor to
Elliott Machine Tools Limited
Filed Apr. 21, 1967, Ser. No. 632,783
Claims priority, application Great Britain, May 19, 1966, 22,247/66
4 Claims. (Cl. 74—805)

ABSTRACT OF THE DISCLOSURE

A control dial for a machine tool has two separate dials, co-axially mounted for rotation relative to each other. One dial is calibrated in inch measure and the other in metric measure, and each is fast with an internal gear, the two gears having, for example 127 and 125 teeth respectively. A third gear meshing with both internal gears is rotatable about a fixed axis eccentric to the dials, so that rotation of one dial effects rotation at a different angular velocity of the other dial. With this construction, a machine tool having a reciprocal pitch head screw can be used by an operator working to metric dimensions without any inconvenience.

---

In the machine tool industry, there is an increasing tendency towards producing machines which are inherently adapted for use both in countries using inch measure as standard (such as Great Britain and the United States of America) and in countries using metric measure (such as the countries of continental Europe), in that they have controls calibrated in both inch and metric units.

The present invention provides a new and improved control dial construction which enables inch and metric readings to be taken simultaneously.

In accordance with the invention, there is provided a control dial construction for a machine tool, comprising two separate dial members calibrated to inch and metric scales respectively and mounted for relative rotation about a common axis, each dial member having fast with it an internal gear, and a third gear meshing with both internal gears and journalled for rotation about a fixed axis eccentric to that of the said common axis to provide a predetermined ratio of angular velocities between the two dial members.

With such a construction, it becomes possible to produce a dial which gives an accurate conversion as between inch and metric measure, and which is, at the same time, sufficiently compact for it to be incorporated on practically any machine tool feed shaft.

One form of control dial in accordance with the invention will now be described, by way of example only, with reference to the accompanying drawing, which shows the dial in axial cross-section.

The dial comprises a central spindle 1 which is shown coupled directly to the lead screw 2 of a machine tool. Keyed to the spindle 1 for rotation therewith is a first body part 3 carrying a pair of projecting handles 4. A first dial member 6 is journalled on a spigot 3A of the body member 3 but may be releasably secured in any desired position of angular adjustment relative thereto by means of a screw 7. A second body member 8 is rotatably mounted on the spindle 1 and is adapted to be secured by any suitable means to a convenient portion F of the frame of the machine tool with which the dial is to be used. A second dial member 9 and a pinion gear 11 are journalled on spigots 9A and 9B of the body member 8, the gear 11 having meshing engagement with internal gears 6A and 9A formed on the respective dial members, and being rotatable about a fixed axis eccentric to the other rotary parts.

The numbers of teeth on the respective internal gears on the dial members are selected to give a desired velocity ratio between the two members 6 and 9. In this example, the dial member 6 is formed with 127 internal teeth, and the dial member 9 is formed with 125 internal teeth. The ratio 127:125 is exactly equal to the ratio 0.2":5 mm., and manufacturing tolerances are negligible for the present purpose.

For application to a standard lead screw having 5 threads per inch, the first dial member 6 is calibrated in inch units with 200 graduations each of .001" and the second dial member 9 is calibrated with 250 graduations each of .02 mm. Thus, a given angular displacement of the first dial member 6 and lead screw 2 corresponding to a feed of 0.25" will, if applied instead to the second dial member 9 produce an angular displacement of the lead screw 2 corresponding to a feed of 6.25 mm.

As is well known, backlash invariably exists in machine tool mechanisms of this kind and, to take account of this we provide friction means between the two dial members, conveniently in the form of a corrugated spring washer 13.

It will be noted that by virtue of the gearing between the two dial members, only a single setting screw 7 is required to set both dials correctly in relation to the lead screw.

Many variations and modifications will, of course, be be possible within the scope of the present invention. For example, other gearing ratios than that described may be used in order to obtain whole numbers of millimetres from fractional inch pitches. One practical alternative is to use gears having 127 and 120 teeth, respectively, to provide a conversion in the ratio of 6 mm. to 0.25 inch.

It will be apparent that the provision of a control dial as described above will enable an operator working in metric units to use a machine tool having a reciprocal pitch lead screw without any inconvenience.

Obviously, it is also possible to design the gears to enable an operator to work in inch measure upon a machine tool having a metric screw thread.

The internal construction of the dial, and in particular the use of the third gear 11 rotating about a fixed, eccentric axis, enables the overall dimensions of the dial to be kept acceptably small. For example, it is possible to design a dial whose outside diameter is less than twice the diameter of the shaft upon which the dial is mounted, which would not be possible if conventional planetary gearing were to be used.

I claim:
1. In a control dial for a machine tool, said dial comprising two co-axial relatively rotatable dial members calibrated to inch and metric scales respectively and gearing between said members coupling the same together for rotation at predetermined angular velocities, the improvement which comprises:
   a first internal gear fast with one said dial member;
   a second internal gear fast with the other said dial member;
   a third gear formed as an external gear meshing with both said first and second internal gears; and
   means mounting said third gear for rotation about a fixed axis eccentric to the axis of rotation of said dial members.

2. The improved control dial claimed in claim 1, wherein said first internal gear has 125 teeth and said second internal gear has 127 teeth.

3. The improved control dial claimed in claim 1, wherein said first internal gear has 127 teeth and said second internal gear has 120 teeth.

4. The improved control dial claimed in claim 1, further comprising a spindle, first and second body parts mounted concentrically upon said spindle, means keying said first body part to said spindle, said second body part being rotatable about said spindle, means mounting one of said dial members upon said first body part, journal means mounting the other of said dial members upon said second body part, and means mounting said third gear upon said second body part for rotation thereupon.

References Cited

UNITED STATES PATENTS

| 1,435,571 | 11/1922 | Wright | 74—440 |
| 1,444,717 | 2/1923 | Webb | 74—805 |
| 2,488,833 | 11/1949 | Sharp et al. | 74—804 |
| 3,045,503 | 7/1962 | Kiessling | 74—805 X |

FOREIGN PATENTS

| 600,847 | 4/1948 | Great Britain. |
| 1,061,795 | 4/1954 | France. |

ARTHUR T. McKEON, *Primary Examiner.*